(12) United States Patent
Kumar et al.

(10) Patent No.: US 12,492,484 B2
(45) Date of Patent: Dec. 9, 2025

(54) METHOD OF COATING A METALLIC SUBSTRATE WITH A POLYMERIC BIOACTIVE COATING

(71) Applicant: KING FAHD UNIVERSITY OF PETROLEUM AND MINERALS, Dhahran (SA)

(72) Inventors: Arumugam Madhan Kumar, Dhahran (SA); Mohamed Abdrabou Hussein, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 617 days.

(21) Appl. No.: 17/950,173

(22) Filed: Sep. 22, 2022

(65) Prior Publication Data
US 2024/0102195 A1    Mar. 28, 2024

(51) Int. Cl.
*C25D 13/12* (2006.01)
*A61L 31/10* (2006.01)
(Continued)

(52) U.S. Cl.
CPC .............. *C25D 13/12* (2013.01); *A61L 31/10* (2013.01); *A61L 31/16* (2013.01); *C09D 5/14* (2013.01); *C09D 5/24* (2013.01); *C09D 165/00* (2013.01)

(58) Field of Classification Search
CPC ......... C25D 13/12; A61L 31/10; A61L 31/16; C09D 5/14; C09D 5/24; C09D 165/00;
(Continued)

(56) References Cited

U.S. PATENT DOCUMENTS 8,133,278 B2 * 3/2012 Atanasoska ............. A61L 31/10
623/1.46
9,272,075 B2    3/2016 Antoni et al.
(Continued)

FOREIGN PATENT DOCUMENTS

EA    12091 B1    8/2009
WO   WO-2015031265 A1 *  3/2015 ........... C09D 5/4476

OTHER PUBLICATIONS

"Electrically-Responsive Antimicrobial Coatings Based on a Tetracycline-Loaded Poly(3,4-Ethylenedioxythiophene) Matrix" by Czerwinska-Glowka et al., Mater. Sci. & Eng. C 123, 112017 (2021).*

(Continued)

*Primary Examiner* — Bryan D. Ripa
(74) *Attorney, Agent, or Firm* — Oblon, McClelland, Maier & Neustadt, L.L.P.

(57) ABSTRACT

A method of coating a metallic substrate includes immersing a metallic substrate in a polymer composition including a conductive 3,4-ethylene dioxythiophene (EDOT) polymer, a gelatin polyelectrolyte, an antibacterial drug, an organic solvent, and an inorganic salt solute, and further coating the polymer composition onto a surface of the metallic substrate by cyclic voltammetry to form a coating on the surface of the metallic substrate. The coating on the metallic substrate is performed such that the gelatin and the antibacterial drug are uniformly distributed throughout the coating, and the coating has a thickness between 7.0 and 15.0 micrometers. The metallic substrate is a stainless steel (SS). An implantable medical device including a metallic substrate coated by the present method.

18 Claims, 7 Drawing Sheets

(51) Int. Cl.
*A61L 31/16* (2006.01)
*C09D 5/14* (2006.01)
*C09D 5/24* (2006.01)
*C09D 165/00* (2006.01)

(58) Field of Classification Search
CPC .... C08G 2261/1424; C08G 2261/3223; C08G 2261/794; C08G 2261/95; C08G 61/12; C08G 61/126; C08L 65/00
See application file for complete search history.

(56) References Cited

U.S. PATENT DOCUMENTS

| | | | | |
|---|---|---|---|---|
| 2006/0124466 | A1* | 6/2006 | Xu | C25D 15/00 |
| | | | | 205/109 |
| 2010/0068461 | A1 | 3/2010 | Wallace et al. | |
| 2012/0041285 | A1 | 2/2012 | Goodall et al. | |
| 2016/0086685 | A1* | 3/2016 | Mallires | C25B 3/00 |
| | | | | 252/500 |
| 2018/0282472 | A1* | 10/2018 | Cheng | C08G 61/126 |
| 2021/0038773 | A1* | 2/2021 | Cui | A61N 1/0502 |

OTHER PUBLICATIONS

"Influence of Electropolymerization Conditions on the Morphological and Electrical Properties of PEDOT Film" by Cysewska et al., Electrochmica Acta 176, pp. 156-161 (2015).*

Esrafilzadeh, et al. ; Multifunctional conducting fibres with electrically controlled release of ciprofloxacin ; 2013 ; Australian Institute for Innovative Materials—Papers, 783 ; 17 Pages.

Hsu, et al. ; Anti-Bacterial and Anti-Fouling Capabilities of Poly(3,4-Ethylenedioxythiophene) Derivative Nanohybrid Coatings on SUS316L Stainless Steel by Electrochemical Polymerization ; MDPI Polymers, 12 ; 2020 ; 12 Pages.

Czerwinska-Glowka, et al. ; Electrically-responsive antimicrobial coatings based on a tetracycline-loaded poly(3,4-ethylenedioxythiophene) matrix ; Materials Science and Engineering: C, vol. 123 ; Apr. 2021 ; 33 Pages.

* cited by examiner

*Staphylococcus aureus* ATCC43300

*Escherichia coli* ATCC8739

METHOD OF COATING A METALLIC SUBSTRATE WITH A POLYMERIC BIOACTIVE COATING

BACKGROUND

Technical Field

The present disclosure is directed to a method of coating a metallic substrate with a coating material, particularly a poly (3,4-ethylene dioxythiophene) (PEDOT)-gelatin-ciprofloxacin coating material, and a method of use.

Description of Related Art

The "background" description provided herein is to generally present the context of the disclosure. Work of the presently named inventors, to the extent it is described in this background section, as well as aspects of the description that may not otherwise qualify as prior art at the time of filing, are neither expressly nor impliedly admitted as prior art against the present invention.

Metal surfaces coated with organic layers provide numerous advanced features with high potential applicability. This technique permits the tailoring of various characteristics, such as elasticity, wettability, bioactivity, and adhesiveness [Reggente, M.; Natali, M.; Passeri, D.; Lucci, M.; Davoli, I.; Pourroy, G.; Masson, P.; Palkowski, H.; Hangen, U.; Carradò, A.; et al. Multiscale mechanical characterization of hybrid Ti/PMMA layered materials. Colloids Surf A Physicochem. Eng. Asp. 2017, 532, 244-251]. Conventionally, polymer coatings can be applied to impart post-implantation corrosion resistance. Improved bioactivity, corrosion resistance, and antifouling properties were achieved for 316L stainless steel (SS) by applying a pseudopeptide polymer coating [A. Joseph Nathanael and Tae Hwan Oh.; Biopolymer Coatings for Biomedical Applications.; Polymers 2020, 12, 3061]. Poly (2-methyl-2-oxazoline) (PMOXA) was a pseudopeptide polymer to produce a non-brush bionic polymer coating by the electrochemical assembly on a 316L SS surface [Liu, S.; Chen, C.; Chen, L.; Zhu, H.; Zhang, C.; Wang, Y. Pseudopeptide polymer coating for improving biocompatibility and corrosion resistance of 316L stainless steel. RSC Adv. 2015, 5, 98456-98466].

A unique method for producing composite polymer coatings on the surface of the magnesium alloy MA8 was reported [Gnedenkov, S. V.; Sinebryukhov, S. L.; Mashtalyar, D. V.; Egorkin, V. S.; Sidorova, M. V.; Gnedenkov, A. S. Composite polymer-containing protective coatings on magnesium alloy MA8. Corros. Sci. 2014, 85, 52-59]. Significant improvements were reported in the protective and antifriction properties of the magnesium alloy surfaces owing to the special treatment of plasma electrolytic oxidation (PEO) coatings by super-dispersed polytetrafluoroethylene (SPTFE). Gnedenkov et al also reported a PEO-based method for preparing hydroxyapatitepolytetrafluoroethylene (PTFE) composite coatings on Mg—Mn—Ce alloys for use in resorbable implants [Gnedenkov, S. V.; Sinebryukhov, S. L.; Zavidnaya, A. G.; Egorkin, V. S.; Puz', A. V.; Mashtalyar, D. V.; Sergienko, V. I.; Yerokhin, A. L.; Matthews, A. Composite hydroxyapatite-PTFE coatings on Mg—Mn—Ce alloy for resorbable implant applications via a plasma electrolytic oxidation-based route. J. Taiwan Inst. Chem. Eng. 2014, 45, 3104-3109]. Although numerous polymer coatings have been developed by various methods in the past for use in implants/other biomedical devices, there still exists a need to develop coatings with improved corrosion resistance and antibacterial activity.

In view of the forgoing, one objective of the present disclosure is to provide a method of coating a metallic substrate including forming a biodegradable poly (3,4-ethylene dioxythiophene)-gelatin-ciprofloxacin material on a surface of the metallic substrate. A further objective of the present disclosure is to provide methods for making an implantable medical device including the metallic substrate coating by electrochemical deposition.

SUMMARY

In an exemplary embodiment, a method of coating a metallic substrate is disclosed. The method includes forming a polymer composition including a conductive 3,4-ethylene dioxythiophene (EDOT) polymer, a gelatin polyelectrolyte, an antibacterial drug, an organic solvent, and an inorganic salt solute. The method further includes immersing a metallic substrate into the polymer composition and coating the polymer composition onto a surface of the metallic substrate by cyclic voltammetry to form a coating on the surface of the metallic substrate. In some embodiments, the metallic substrate is a stainless steel (SS). In some embodiments, the gelatin and the antibacterial drug are uniformly distributed throughout the coating. In some embodiments, the coating has a thickness between 7.0 and 15.0 micrometers ($\mu m$).

In some embodiments, the coating has a thickness between 9.50 and 12.55 $\mu m$.

In some embodiments, the coating has a surface morphology including a three-dimensional granular layer having a plurality of particles present as microfibrils in directions parallel to the surface of the metallic substrate and the plurality of particles present as microfibrils having a uniform distribution throughout the granular layer.

In some embodiments, the plurality of particles is present as microfibrils having an average size in a range of 1 to 15 $\mu m$.

In some embodiments, the plurality of cauliflower shaped clusters have an average size in a range of 10 to 25 $\mu m$.

In some embodiments, the coating is a single layer coating.

In some embodiments, the coating is a multilayer coating.

In some embodiments, the conductive polymer further includes at least one selected from the group consisting of polyaniline, polyphenylene, polyacetylene, polypyrrole, poly (N-alkyl pyrrole), polythiophene, poly (alkyl thiophene), polyfuran, polypyridine, polynaphthalene, poly (phenylene vinylene), and copolymers thereof. In some embodiments, the conductive polymer is present in the polymer composition in an amount of 70 to 99.9 wt. %.

In some embodiments, the gelatin is present in the polymer composition in an amount of 0.1 to 20 wt. %.

In some embodiments, the organic solvent is at least one selected from the group consisting of acetonitrile (ACN), pyridine, N, N-dimethylformamide (DMF), dimethyl sulfoxide (DMSO), dioxane, formamide, 2-methoxy ethanol (MCS), tetrahydrofuran (THF), propylene carbonate, ethanol, and dichloromethane (DCM).

In some embodiments, the inorganic salt solute is at least one selected from the group consisting of quaternary ammonium salts, lithium salts, perchlorate salts, metal phosphates, metal oxides, metal hydroxides, and metal peroxides.

In some embodiments, the metallic substrate is at least one selected from the group consisting of a $Ti_6Al_4V$ alloy, and a $Ti_{20}Nb_{13}Zr$ alloy.

In some embodiments, the antibacterial drug is ciprofloxacin (CF). In some embodiments, the antibacterial drug is present in the polymer composition in an amount of 0.1 to 15 wt. %.

In some embodiments, the coating formed from the polymer composition has an antibacterial rate in a range of 75% to 95% against *E. coli*, and an antibacterial rate of about 73% to 93% against *Staphylococcus aureus*.

In some embodiments, the coated metallic substrate has a corrosion potential ($E_{corr}$) value measured versus saturated calomel electrode of −0.4 to 0.2 voltage ($V_{SCE}$).

In some embodiments, the coated metallic substrate has a current density ($I_{corr}$) value measured versus saturated calomel electrode of 0.02 to 2.0 microamperes per square centimeter ($\mu A/cm^2$).

In some embodiments, the method further includes mixing lithium perchlorate ($LiClO_4$), acetonitrile (ACN), 3,4-ethylene dioxythiophene (EDOT), the gelatin, and the antibacterial drug to form an electrolyte solution and adding the electrolyte solution to a three-electrode cell assembly containing a SS alloy specimen, a saturated calomel electrode (SCE), and a graphite rod. All three electrodes are at least partially immersed in the electrolyte solution. In some embodiments, the method further includes applying a potential to the three-electrode cell assembly to form a wet coated metallic substrate and removing the wet coated metallic substrate from the electrolyte solution, washing, and drying to form a PEDOT/GE/CF coated metallic substrate.

In some embodiments, the PEDOT/GE/CF coated metallic substrate has a thickness between 9.50 and 12.55 μm, an $E_{corr}$ value measured versus saturated calomel electrode of from 0.04 to 0.08 $V_{SCE}$, an $I_{corr}$ value measured versus saturated calomel electrode of from 0.02 to 0.10 $\mu A/cm^2$, an antibacterial rate of about 80 to 90% against *E. coli*, and an antibacterial rate of about 80 to 90% against *Staphylococcus aureus*.

In some embodiments, an implantable medical device including the metallic substrate coated by the method of the present disclosure is disclosed.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
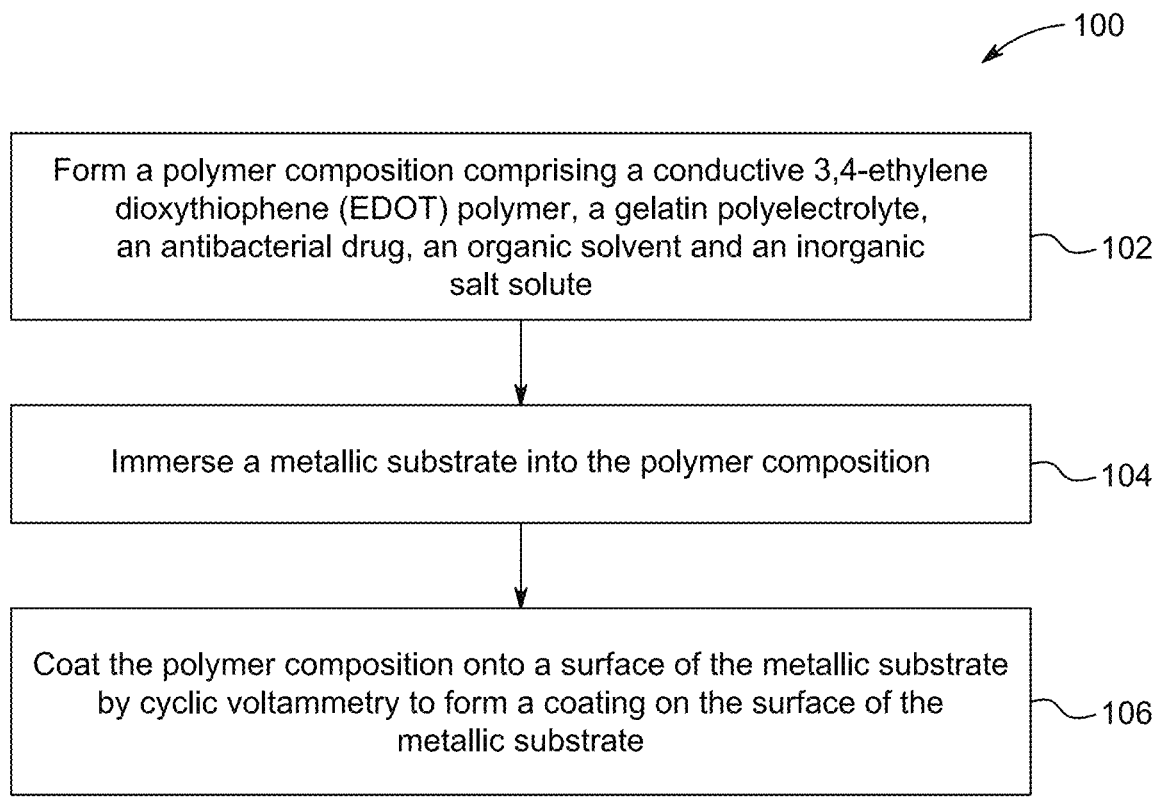
FIG. 1 is a schematic flow diagram of a method of coating a metallic substrate, according to certain embodiments.

In the drawings, reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

As used herein, the term "composition" refers to a combination and/or mixture of distinct chemical substances and/or constituents that form a whole.

As used herein, the term "metallic" refers to a conductive material having therein at least one metallic element.

As used herein, the term "substrate" refers to a solid support onto which a composition and/or matrix is deposited. The term "substrate" is also not constructed to be limited to any shape or size.

As used herein, the term "surface" refers to any portion of the total surface of the substrate.

As used herein, the term "coating" refers to the settled layer of the some or all exposed surfaces being coated in substrate. The term "coating" also includes coatings which contact the surface of the metallic substrate, those which are spaced from the metallic substrate by one or more interposed material, and those which are overlain by any top coating.

As used herein, the term "antibacterial" refers to the microbicidal or microbistatic properties of a compound, composition, article, or material that enables it to kill, destroy, inactivate, or neutralize a microbe; or to prevent or reduce the growth, ability to survive, or propagation of a microorganism. As used herein, "microbe" or "microorganism" refers to any organism or combination of organisms able to cause infection, such as bacteria, viruses, protozoa, yeasts, fungi, molds, or spores formed by any of these.

As used herein, the term "conductive" or "conductivity" refers to an ability to transport an electric current. Unless otherwise specified, conductivity of a material is defined at room temperature.

As used herein, the term "polyelectrolyte" refers to a class of macromolecular compounds which, when dissolved in a suitable solvent, such as water, spontaneously acquire or can be made to acquire a large number of elementary charges distributed along the macromolecular chain. The polyelectrolytes may have either anionic charges or cationic charges.

The term is intended to encompass a single polyelectrolyte or a mixture of two or more polyelectrolytes of the same type, such as anionic and cationic polyelectrolytes.

As used herein, the term "solvent" refers to a substance, usually a liquid, capable of dissolving another substance, e.g., a solid substance, semi-solid substance, or a liquid. Typical solvents include water and organic solvents. It is appreciated by those of skill in the art that the solvent should not chemically react with any of the materials or reagents present in the composition or mixture, to any significant degree, under the reaction conditions employed.

As used herein, the term "solute" refers to a substance, which is a solid, a liquid or a gas, that is dissolved in a liquid to make a solution. A solute is usually a component of a solution which is present in a small amount relative to the solvent.

As used herein, the term "cyclic voltammetry" or "CV" refers to a type of potentiodynamic electrochemical measurement. Cyclic voltammetry is generally used to study the electrochemical properties of an analyte, such as a charged metal ion, in solution. The method uses a reference electrode, working electrode, and counter electrode which in combination are sometimes referred to as a three-electrode setup. Common materials for working electrodes include glassy carbon, screen printed carbon, platinum, gold, and the like.

As used herein, the term "implantable medical device" is any device intended to be partially or wholly introduced, inserted, or implanted within a subject's body for one or more therapeutic or prophylactic purposes, such as restoring physiological function, alleviating symptoms associated with disease, delivering therapeutic agents, detecting changes (or levels) in the internal environment, and/or repairing or replacing or augmenting damaged or diseased organs and tissues.

A biocompatible poly (3,4-ethylene dioxythiophene) (PEDOT)-gelatin (GE)-ciprofloxacin (CF) hybrid composite coating material is synthesized and coated onto a surface of a stainless-steel (SS) specimen (316L SS alloy substrate). The substrate may be metallic, e.g., 316L stainless steel (SS), pure titanium, $Ti_6Al_4V$ alloy, $Ti_{20}Nb_{13}Zr$ alloy substrate, or metallic bioimplant material. Although the description refers to the use of SS as the metallic substrate, it may be understood by a person skilled in the art that the methods of the present disclosure may be adapted to other metallic substrates as well. The metallic substrate coated with the hybrid composite coating material of the present disclosure can be used for biological, veterinary, and/or human medicinal applications.

PEDOT coatings are prepared with different percentages of gelatin (GE) in a range of 0.5 to 15 wt. %, and ciprofloxacin (CF) in a range of 0.5 to 10 wt. %. The coatings may have a thickness between 9.50 and 12.55 μm. The coating is fabricated electrochemically using a cyclic voltammetry (CV) method from a lithium perchlorate/acetonitrile (LiClO$_4$/ACN) solution comprising ethylene dioxythiophene (EDOT), gelatin, with and without the antibacterial agent ciprofloxacin. In vitro, corrosion-resistant analyses in a simulated body fluid (SBF) of the coating validated improved surface protective performance against corrosion in PEDOT samples with GE. Antibacterial tests confirmed the enhanced antibacterial performance of drug-loaded or CF-loaded PEDOT/GE coating. The results show that the PEDOT/GE coatings with the inclusion of the antibacterial drug (CF) can be used as a coating material on implants for biomedical applications.

According to a first aspect of the present disclosure, a method of coating a metallic substrate comprises (i) forming a polymer composition, (ii) immersing a metallic substrate into the polymer composition, and (iii) coating the polymer composition onto a surface of the metallic substrate by cyclic voltammetry to form a coating on the surface of the metallic substrate.

Referring to FIG. 1, a schematic flow diagram of a method 100 of coating a metallic substrate is illustrated. The method 100 is described with reference to formation of the antimicrobial coated textile illustrated in FIG. 2. The order in which the method 100 is described is not intended to be construed as a limitation, and any number of the described method steps may be combined in any order to implement the method 100. Additionally, individual steps may be removed or skipped from the method 100 without departing from the spirit and scope of the present disclosure.

At step 102, the method 100 includes forming a polymer composition including a conductive 3,4-ethylene dioxythiophene (EDOT) polymer, a gelatin polyelectrolyte, an antibacterial drug, an organic solvent, and an inorganic salt solute. The antibacterial drug can be any antibacterial drug known in the art. In some embodiments, the antibacterial drug is at least one selected from the group consisting of amoxicillin, erythromycin, ciprofloxacin, plazomicin, eravacycline, pretomanid, omadacycline, rifamycin, imipenem, cilastatin, relebactam combination, sarecycline, lefamulin, and cefiderocol. In a preferred embodiment, the antibacterial drug may be ciprofloxacin. In accordance with the present invention, in certain aspects, the antibacterial drug is present in the polymer composition in an amount of 0.1 to 15 wt. %, preferably 0.5 to 13.5 wt. %, more preferably 1 to 12 wt. %, further preferably 2.5 to 10 wt. %, and even more preferably 5 to 10 wt. %. Other ranges are also possible.

In some embodiments, the organic solvent is at least one selected from the group consisting of acetonitrile (ACN), pyridine, N, N-dimethylformamide (DMF), dimethyl sulfoxide (DMSO), dioxane, formamide, 2-methoxyethanol (MCS), tetrahydrofuran (THF), propylene carbonate, ethanol, and dichloromethane (DCM). In a preferred embodiment, the organic solvent is acetonitrile.

In some embodiments, the inorganic salt solute is at least one selected from the group consisting of quaternary ammonium salts, lithium salts, perchlorate salts, metal phosphates, metal oxides, metal hydroxides, and metal peroxides. In a preferred embodiment, the inorganic salt solute is a lithium salt. In some embodiments, the lithium salt is at least one selected from the group consisting of lithium perchlorate (LiClO$_4$), lithium tetrafluoroborate (LiBF$_4$), lithium hexafluorophosphate (LiPF$_6$), lithium hexafluoroarsenate (LiAsF$_6$), lithium bistrifluoromethanesulfonimidate (LiTf), lithium sulfonate (LiSA), lithium bis(fluorosulfonyl)imide (LiFSI), lithium bis(trifluoromethanesulfonyl)imide (LiTFSI), lithium bis(pentafluoroethanesulfonyl)imide (LiBETI), lithium cyano(trifluoromethanesulfonyl)imide (LiCTFSI), lithium polybis(trifluoromethanesulfonyl)imide (LiTFSI polymer), lithium bis(oxalato)borate (LiBOB), lithium 2-trifluoromethyl-4,5-dicyanoimidazole (LiTDI), lithium 4,5-dicyano-1,2,3-triazolate (LiDCTA), lithium tetracyanoborate (LiB(CN)$_4$). In a more preferred embodiment, the lithium salt may be LiClO$_4$. In accordance with the present invention, in certain aspects, the inorganic salt may be firstly dissolved in a suitable solvent such as acetonitrile, pyridine, DMF, DMSO, dioxane, formamide, 2-methoxyethanol, THF, propylene carbonate, ethanol, DCM, and mixtures thereof in suitable proportions, which results in the formation of a solution. In certain aspects, the inorganic salt is present in the solution at a concentration of greater than or equal to 0.05 M, greater than or equal to 0.1 M, greater than or equal to 0.3 M, greater than or equal to 0.5 M, greater than or equal to 1 M, or greater than or equal to 2 M. In certain aspects, the inorganic salt is present in the solution at a concentration of less than or equal to 3 M, less than or equal to 2 M, less than or equal to 1 M, less than or equal to 0.5 M, less than or equal to 0.3 M, or less than or equal to 0.1 M. Other ranges are also possible.

In some embodiments, the polymer composition may further include at least one conductive polymer selected from the group consisting of polyaniline, polyphenylene, polyacetylene, polypyrrole, poly (N-alkyl pyrrole), polythiophene, poly (alkyl thiophene), polyfuran, polypyridine, poly naphthalene, poly (phenylene vinylene), and copolymers thereof.

In a preferred embodiment, the conductive polymer may be a 3,4-ethylene dioxythiophene polymer. In some embodiments, the conductive polymer monomer is present in the polymer composition in an amount of 70 to 99 wt. %, preferably 75 to 96 wt. %, further preferably 80 to 93 wt. %, and even more preferably 85 to 90 wt. %. In accordance with the present invention, in certain aspects, the conductive polymer monomer may be dissolved in a suitable solvent such as acetonitrile, pyridine, DMF, DMSO, dioxane, formamide, 2-methoxyethanol, THF, propylene carbonate, ethanol, DCM, and mixtures thereof in suitable proportions, which results in the formation of a solution. In certain aspects, the conductive polymer monomer is present in the solution at a concentration of greater than or equal to 0.01 M, greater than or equal to 0.05 M, greater than or equal to 0.1 M, greater than or equal to 0.2 M, greater than or equal to 0.5 M, or greater than or equal to 1 M. In certain aspects, the conductive polymer monomer is present in the solution at a concentration of less than or equal to 2 M, less than or equal to 1 M, less than or equal to 0.5 M, less than or equal to 0.2 M, less than or equal to 0.1 M, or less than or equal to 0.05 M. Other ranges are also possible.

In some embodiments, the polymer composition may further include at least one polyelectrolyte selected from the group consisting of gelatin, sugar, starch, cellulose, and collagen. In a more preferred embodiment, the polyelectrolyte may be a gelatin polyelectrolyte. In some embodiments, the gelatin is present in the polymer composition in an amount of 0.1 to 20 wt. %, preferably 2.5 to 17.5 wt. %, preferably 5 to 15 wt. %, further preferably 7.5 to 12.5 wt. %, or even more preferably 10 wt. %. In accordance with the present invention, in certain aspects, the gelatin may be dissolved or dispersed in a suitable solvent such as acetonitrile, pyridine, DMF, DMSO, dioxane, formamide, 2-methoxyethanol, THF, propylene carbonate, ethanol, DCM, and mixtures thereof in suitable proportions, which results in the formation of a solution or a dispersion. In one embodiment, the gelatin has a molecular weight of greater than or equal to 10 kilodaltons (kDa), greater than or equal to 50 kDa, greater than or equal to 100 kDa, greater than or equal to 150 kDa, greater than or equal to 200 kDa, greater than or equal to 250 kDa, greater than or equal to 300 kDa, greater than or equal to 350 kDa, greater than or equal to 400 kDa, or greater than or equal to 450 kDa. In another embodiment, the gelatin has a molecular weight of less than or equal to 500 kDa, less than or equal to 450 kDa, less than or equal to 400 kDa, less than or equal to 350 kDa, less than or equal to 300 kDa, less than or equal to 250 kDa, less than or equal to 200 kDa, less than or equal to 150 kDa, less than or equal to 100 kDa, or less than or equal to 50 kDa. Other ranges are also possible.

Accordingly, at step 102, the method 100 further includes mixing the conductive 3,4-ethylene dioxythiophene (EDOT) polymer, the gelatin polyelectrolyte, the antibacterial drug, the organic solvent, and the inorganic salt solute at a temperature in a range of from about 5 to 50° C., from about 10 to 40° C., from about 15 to 35° C., or from about 20 to 30° C. for 0.5 to 24 hours, preferably 1 to 12 hours, preferably 2 to 6 hours, and more preferably 3 hours. Other ranges are also possible.

At step 104, the method 100 includes immersing a metallic substrate into the polymer composition. In some embodiments, the metallic substrate includes steel, carbon steel, low carbon steel, mild steel, medium carbon steel, high carbon steel, alloy steel, stainless steel, austenitic steel, ferritic steel, martensitic steel, tool steel, or mixtures thereof. Preferably, the metallic substrate may be a stainless steel (SS). In some embodiments, the metallic substrate may be at least one selected from the group consisting of a Ti$_6$Al$_4$V alloy, and a Ti$_{20}$Nb$_{13}$Zr alloy. The metallic substrate is at least partially immersed into the polymer composition. In one embodiment, the metallic substrate is at least 1% of the surface area based on a total surface area of the metallic substrate immersed into the polymer composition. In another embodiment, the metallic substrate is at least 10% of the surface area based on a total surface area of the metallic substrate immersed into the polymer composition. In a further embodiment, the metallic substrate is at least 30% of the surface area based on a total surface area of the metallic substrate immersed into the polymer composition. In a preferred embodiment, the metallic substrate is at least 50% of the surface area based on a total surface area of the metallic substrate immersed into the polymer composition. In a more preferred embodiment, the metallic substrate is at least 70% of the surface area based on a total surface area of the metallic substrate immersed into the polymer composition. In a further preferred embodiment, the metallic substrate is at least 90% of the surface area based on a total surface area of the metallic substrate immersed into the polymer composition. In an even more preferred embodiment, the metallic substrate is at least 99% of the surface area based on a total surface area of the metallic substrate immersed into the polymer composition.

At step 106, the method 100 includes coating the polymer composition onto a surface of the metallic substrate by cyclic voltammetry to form a coating on the surface of the metallic substrate. In some embodiments, the polymer composition comprises 0.05 to 0.5 M of 3,4-ethylene dioxythiophene (EDOT) monomer, 0.05 to 1.5 M of the inorganic salt solute. In some embodiments, the polymer composition further comprises 5 to 15 wt. % of the gelatin polyelectrolyte, wt. % based on a total weight of the polymer composition. In some embodiments, the polymer composition further comprises 2.5 to 10 wt. % of the antibacterial drug, wt. % based on a total weight of the polymer composition. Other ranges are also possible.

A three-electrode cell assembly containing a working electrode, a counter electrode, and a reference electrode is deployed in the formation of the coating on the surface of the metallic substrate. All three electrodes are at least partially immersed in an electrolyte solution. In a first aspect, the working electrode may be the metallic substrate. In another aspect, the electrolyte solution may be the polymer composition. In some embodiments, each of the three electrodes is at least 1% of the surface area based on a total surface area of the substrate immersed into the electrolyte solution, at least 10% of the surface area based on a total surface area of the substrate immersed into the electrolyte solution, at least 30% of the surface area based on a total surface area of the substrate immersed into the electrolyte solution, at least 50% of the surface area based on a total surface area of the substrate immersed into the electrolyte solution, at least 70% of the surface area based on a total surface area of the substrate immersed into the electrolyte solution, at least 90% of the surface area based on a total surface area of the substrate immersed into the electrolyte solution, or at least 99% of the surface area based on a total surface area of the substrate immersed into the electrolyte solution. A potential is applied to the three-electrode cell assembly to form a wet-coated metallic substrate. The applied potential measured versus saturated calomel electrode is swapped between −0.4 and +2.0 $V_{SCE}$, preferably between −0.35 and +1.8$V_{SCE}$, more preferably between −0.3 and +1.6 $V_{SCE}$, further preferably between −0.25 and +1.4 $V_{SCE}$, and even more preferably between −0.2 to 1.2 $V_{SCE}$ at a scan rate of 5 to 50 mV/s, preferably 10 to 40 mV/s, preferably 15 to 35 mV/s, further preferably 20 to 30 mV/s, or even more preferably 25 mV/s for at least 1 cycle, at least 5 cycles, at least 10 cycles, at least 15 cycles, or at least 20 cycles, and for no more than 30 cycles, no more than 25 cycles, no more than 20 cycles, no more than 15 cycles, no more than 10 cycles, or no more than 5 cycles. Other ranges are also possible.

The coating has a surface morphology including a three-dimensional granular layer having a plurality of particles present as microfibrils in directions parallel to the surface of the metallic substrate. The coating has a rough surface including (i) a plurality of granular shaped particles in the form of microfibrils in directions parallel to the surface of the metallic substrate, and (2) a plurality of cauliflower shaped clusters that are uniformly distributed on the surface of the coating.

The plurality of granular shaped particles present as microfibrils have a uniform distribution throughout the surface of the coating layer. In some embodiments, the plurality of granular shaped particles present as microfibrils have an average size in a range of 1 to 15 µm. In a preferred embodiment, the plurality of granular shaped particles present as microfibrils have an average size in a range of 3 to 13 µm. In a more preferred embodiment, the plurality of granular shaped particles present as microfibrils have an average size in a range of 5 to 11 µm. In an even more preferred embodiment, the plurality of granular shaped particles present as microfibrils have an average size in a range of 7 to 9 µm. In certain aspects, the particle size of the granular shaped particles present as microfibrils increases with the increase of an amount of the gelatin present in the polymer composition. In certain other aspects, the particle size of the granular shaped particles present as microfibrils increases with the increase of an amount of the antibacterial drug present in the polymer composition. Other ranges are also possible.

In some embodiments, the plurality of cauliflower shaped clusters are on top of the plurality of the microfibrils. In some embodiments, the plurality of cauliflower shaped clusters have an average size in a range of 10 to 25 µm, preferably 15 to 20 µm, and more preferably about 17 µm. In certain aspects, the particle size of the cauliflower shaped clusters increases with the increase of an amount of the gelatin present in the polymer composition. In certain other aspects, the particle size of the cauliflower shaped clusters increases with the increase of an amount of the antibacterial drug present in the polymer composition. Other ranges are also possible.

As used herein, the term "uniform," "uniformity," or "uniformly" generally include but not limited to uniform particle size. The term "uniform" with respect to particle size generally refers to a polymer composition in which individual particles and/or clusters have a specific range of particle diameter sizes. In some embodiments, the particles used herein are monodisperse, having a coefficient of variation or relative standard deviation, expressed as a percentage and defined as the ratio of the particle size standard deviation ($\sigma$) to the particle size mean ($\mu$) multiplied by 100 of less than 25%, preferably less than 10%, preferably less than 8%, preferably less than 6%, preferably less than 5%, preferably less than 4%, preferably less than 3%, preferably less than 2%. In a preferred embodiment, the particles used herein are monodisperse having a particle size distribution ranging from 80% of the average particle size to 120% of the average particle size, preferably 90-110%, preferably 95-105% of the average particle size. In some other embodiments, the clusters used herein are polydisperse, having a coefficient of variation or relative standard deviation, expressed as a percentage and defined as the ratio of the particle size standard deviation ($\sigma$) to the particle size mean ($\mu$) multiplied by 100 of less than 25%, preferably less than 10%, preferably less than 8%, preferably less than 6%, preferably less than 5%, preferably less than 4%, preferably less than 3%, preferably less than 2%. In a preferred embodiment, the clusters used herein are polydisperse having a particle size distribution ranging from 80% of the average particle size to 120% of the average particle size, preferably 90-110%, preferably 95-105% of the average particle size.

As used herein, the term "morphology" with respect to surface morphology refers to the microgeometry, shape and form of the surface texture coated on a substrate using the methods disclosed herein.

As used herein, the term "rough," "roughness," "surface roughness," or other similar terms are defined by the norm ISO 4287-1:1984 (Surface roughness—Terminology—Part 1: Surface and its parameters). The term "surface roughness" can for instance be measured by non-contact, optical profilometry based on interferometry (VEECO, Wyko NT3300—A. G. Olszak, J. Schmit, M. G. Heaton, "Interferometry: Technology and Applications," Veeco Instruments, Inc., 2650 E. Elvira Road, Tucson, Ariz. 85706, 2001). The "surface roughness" may also include, for example, arithmetic average roughness $R_a$, maximum height roughness $R_z$, root-mean-square roughness $R_q$, or the like.

In a further preferred embodiment, a polymer coating having a surface having a plurality of granular shaped particles in the form of microfibrils formed from a polymer composition comprising a EDOT polymer, a gelatin and an antibacterial drug is produced, e.g., using a method described herein, that are monodisperse, exhibiting a range of degrees of polymerization of about 1 to 100, preferably 5 to 75, preferably 10 to 50, or even more preferably 15 to 25. In certain aspects, the gelatin is present in the polymer composition in an amount of less than 5 wt. %, preferably less than 3 wt. %, preferably less than 1 wt. %, or even more preferably less than 0.5 wt. %. In certain other aspects, the antibacterial drug is present in the polymer composition in an amount of less than 5 wt. %, preferably less than 3 wt. %, preferably less than 1 wt. %, or even more preferably less than 0.1 wt. %. Other ranges are also possible.

In still another preferred embodiment, a polymer coating having a surface having (i) a plurality of granular shaped particles in the form of microfibrils, and (ii) a plurality of cauliflower shaped clusters formed from a polymer composition comprising a EDOT polymer, a gelatin and an antibacterial drug is produced, e.g., using a method described herein, that are polydisperse, exhibiting a range of degrees of polymerization of about 1 to 30, preferably 3 to 25, preferably 6 to 20, or even more preferably 9 to 12. In certain aspects, the gelatin is present in the polymer composition in an amount of at least 5 wt. %, preferably at least 7 wt. %, preferably at least 15 wt. %, or even more preferably at least 20 wt. %. In certain other aspects, the antibacterial drug is present in the polymer composition in an amount of at least 5 wt. %, preferably at least 9 wt. %, preferably at least 12 wt. %, or even more preferably at least 15 wt. %. Other ranges are also possible. In some embodiments, the coating formed on the surface of the metallic substrate from a polymer composition comprising 0.3 M of the 3,4-ethylene dioxythiophene, 5 to 15 wt. % of the gelatin based on a total weight of the polymer composition, 2.5 to 10 wt. % of the antibacterial ciprofloxacin based on a total weight of the polymer composition, acetonitrile, and 0.3 M of $LiClO_4$ displays a rough surface compared to a pure PEDOT coating, e.g., using a method described herein here, due to the increased particle size of the polymer coating present as microfibrils. In some further embodiments, the coating is formed on the surface of the metallic substrate by (i) immersing the metallic substrate in the polymer composition mentioned above, (ii) applying a potential of −0.2 V to +1.2 V vs. saturated calomel electrode (SCE) to the metallic substrate at a scan rate of 25 mV/s for ten cycles. In some preferred embodiments, the rough surface of the coating has (i) a plurality of granular shaped particles in the form of microfibrils in directions parallel to the surface of the metallic substrate, and (2) a plurality of cauliflower shaped clusters that are uniformly distributed on the surface of the coating. In certain embodiments, the particles in microfibrils and cauliflower shaped clusters can be adjusted by varying (i) the components and its corresponding amount present in the polymer composition, (2) the applied potential to the metallic substrate, (iii) the scan rate, and (iv) numbers of cycles.

The coating is performed such that the gelatin and the antibacterial drug are uniformly distributed throughout the surface of the metallic substrate. The coating has a thickness between 7.0 and 15.0 micrometers (μm). In some embodiments, the coating has a thickness between 9.50 and 12.55 μm. In some preferred embodiments, the coating has a thickness between 10 and 12 μm. The coating may be a single-layer coating or a multi-layer coating. In some embodiments, the coating is a single-layer coating. In some embodiments, the coating is a multilayer coating.

As used herein, the term "corrosion potential" refers to the potential measured when the metal reaches a stable corrosion state in the absence of an applied current. It is the mixed potential of anodic and cathodic reactions polarized by the self-etching current, at which point the conjugation reaction on the metal is dissolution of the metal and reduction of the depolarizer, for example, the potential that is generated when the metal is not passing current through the medium. It may also be referred to as a natural potential, a self-etching potential, a natural etching potential, a self-etching potential, or an electric potential. Herein, corrosion potential is tested using ASTM G69. The test instrument is i.e., an electrochemical workstation.

As used herein, the term "current density" refers to electric (or electrical) current per unit area of cross section, such as the cross section of a substrate. In some examples, current density is electric current per unit area of a surface of a coated metallic substrate.

In accordance with the present invention, the coated metallic substrate has a corrosion potential ($E_{corr}$) value measured versus saturated calomel electrode of −0.4 to 0.2 voltage ($V_{SCE}$), and a current density ($I_{corr}$) value measured versus saturated calomel electrode of 0.02 to 2.0 μA/cm². In a preferred embodiment, the coated metallic substrate has an $E_{corr}$ value measured versus saturated calomel electrode of −0.3 to 0.15 $V_{SCE}$. In a further preferred embodiment, the coated metallic substrate has an $E_{corr}$ value measured versus saturated calomel electrode of −0.1 to 0.1 $V_{SCE}$. In a more preferred embodiment, the coated metallic substrate has an $E_{corr}$ value measured versus saturated calomel electrode of 0 to 0.08 $V_{SCE}$. In an even more preferred embodiment, the coated metallic substrate has an $E_{corr}$ value measured versus saturated calomel electrode of 0.04 to 0.06 $V_{SCE}$. In a preferred embodiment, the coated metallic substrate has an $I_{corr}$ value measured versus saturated calomel electrode of 0.03 to 1 μA/cm². In a further preferred embodiment, the coated metallic substrate has an $I_{corr}$ value measured versus saturated calomel electrode of 0.04 to 0.4 μA/cm². In a more preferred embodiment, the coated metallic substrate has an $I_{corr}$ value measured versus saturated calomel electrode of 0.05 to 0.1 μA/cm². In an even more preferred embodiment, the coated metallic substrate has an $I_{corr}$ value measured versus saturated calomel electrode of 0.06 to 0.08 μA/cm². Other ranges are also possible.

Gram-negative *Escherichia coli* (*E. coli*) and Gram-positive *Staphylococcus aureus* (*S. aureus*) are used to evaluate the antibacterial properties of a coated metal substrate compared to an uncoated metal substrate. The antibacterial assessment also involves a spread plate technique as described in ASTM D5465-16, which a suitable amount of bacteria suspended in a solution is applied over a plate with a sterilized glass spreader having a smooth surfaces. A spread plate will have a countable number of isolated bacteriological colonies evenly distributed on the plate. As used herein, the term "antibacterial rate" is determined using the following equation (Eq. (1)):

$$\text{Antibacterial rate (\%)} = \frac{(N_{uc} - N_c)}{N_{uc}} \times 100 \qquad (1)$$

where, $N_c$ is the number of bacteriological colonies produced on the spread plate with a coated metallic substrate placed in the solution applied over the plate after 8 h of the incubation period, and $N_{uc}$ is the number of bacteriological colonies produced on the spread plate with an uncoated metallic substrate placed in the solution applied over the plate after 8 h of the incubation period.

In some embodiments, the metallic substrate is a 316L stainless steel. In some embodiments, the surface area of the coated and uncoated metallic substrate placed in the spread plate, having a relative standard deviation, expressed as a percentage and defined as the ratio of the surface area standard deviation (σ) to the surface area average (cm) multiplied by 100 of less than 5%, preferably less than 4%, preferably less than 3%, preferably less than 2%, preferably less than 1%, preferably less than 0.5%. In some embodiments, bacteriological colony counts can be determined by following ASTM D5465-16. In some embodiments, the incubation period may be in a range of from about 2 to 48 hours, preferably about 4 to 24 hours, preferably about 6 to 12 hours, or even more preferably about 8 hours. In some embodiments, the antibacterial rate of the coating can be obtained by (i) counting the total number of bacteriological colonies produced on the spread plate in the presence of the coated metallic substrate ($N_c$), and the uncoated metallic substrate ($N_{uc}$), respectively, (ii) calculating the absolute difference of $N_{uc}$ and $N_c$, and (iii) calculating the ratio of the absolute difference to $N_{uc}$ multiplied by 100 as depicted in Eq. (1). In a preferred embodiment, the coating has an antibacterial rate in the range of 75% to 95% against *E. coli* based on a total number of bacteriological colonies produced. In a further preferred embodiment, the coating has an antibacterial rate in the range of 77.5% to 92.5% against *E. coli* based on a total number of bacteriological colonies produced. In a more preferred embodiment, the coating has an antibacterial rate in the range of 80% to 90% against *E. coli* based on a total number of bacteriological colonies produced. In an even more preferred embodiment, the coating has an antibacterial rate in the range of 82.5% to 87.5% against *E. coli* based on a total number of bacteriological colonies produced. In a preferred embodiment, the coating has an antibacterial rate in the range of 73% to 93% against *Staphylococcus aureus* based on a total number of bacteriological colonies produced. In a further preferred embodiment, the coating has an antibacterial rate in the range of 75.5% to 90.5% against *Staphylococcus aureus* based on a total number of bacteriological colonies produced. In a more preferred embodiment, the coating has an antibacterial rate in the range of 78% to 88% against *Staphylococcus aureus* based on a total number of bacteriological colonies produced. In an even more preferred embodiment, the coating has an antibacterial rate in the range of 80.5% to 85.5% against *Staphylococcus aureus* based on a total number of bacteriological colonies produced.

According to a second aspect of the present disclosure, the method of coating a metallic substrate further comprises (i) mixing lithium perchlorate ($LiClO_4$), acetonitrile (ACN), 3,4-ethylenedioxythiophene (EDOT), the gelatin and the antibacterial drug to form an electrolyte solution, (ii) adding the electrolyte solution to a three-electrode cell assembly containing a SS alloy specimen, a saturated calomel electrode (SCE), and a graphite rod, (iii) applying a potential to the three-electrode cell assembly to form a wet coated metallic substrate, and (iv) removing the wet coated metallic substrate from the electrolyte solution, washing, and drying to form a PEDOT/GE/CF coated metallic substrate.

In some embodiments, the PEDOT/GE/CF coated metallic substrate is prepared by mixing lithium perchlorate ($LiClO_4$), acetonitrile (ACN), 3,4-ethylenedioxythiophene (EDOT), the gelatin, and ciprofloxacin to form an electrolyte solution. In one embodiment, the lithium perchlorate is present in the electrolyte solution at a concentration of 0.3 M. In another embodiment, EDOT is present in the electrolyte solution at a concentration of 0.1 M. In a further embodiment, the gelatin is present in the electrolyte solution in an amount of 10 wt. % based on a total weight of the electrolyte solution. In a further preferred embodiment, ciprofloxacin is present in the electrolyte solution in an amount of 10 wt. % based on a total weight of the electrolyte solution.

The electrolyte solution is added to a three-electrode cell assembly containing a SS alloy specimen, a saturated calomel electrode (SCE), and a graphite rod. The SS alloy specimen is a working electrode, the SCE is a counter electrode, and the graphite rod is a reference electrode. All three electrodes are at least partially immersed in the electrolyte solution. Each of those three electrodes are at least 1%, at least 10%, at least 30%, at least 50%, at least 70%, at least 90%, or at least 99% immersed into the electrolyte solution. A potential is applied to the three-electrode cell assembly to form a wet-coated metallic substrate. In some embodiment, the potential is swapped between −0.4 and +1.4 V, preferably between −0.3 and +1.3 V, and more preferably between −0.2 and +1.2 V vs. SCE at a scan rate of 20 to 30 mV/s, preferably 22.5 to 27.5 mV/s, and more preferably 25 mV/s for at least 8 cycles, preferably at least 10 cycles, or more preferably at least 12 cycles, and for no more than 15 cycles, preferably no more than 12 cycles, or more preferably no more than 9 cycles.

The wet coated metallic substrate is then removed from the electrolyte solution, and further washed and dried to form a PEDOT/GE/CF coated metallic substrate. The PEDOT/GE/CF coated metallic substrate has a thickness between 9.50 and 12.55 μm, preferably between 10 to 12 μm, or more preferably 11 μm.

Electrochemical corrosion tests reveal that the PEDOT/GE/CF coated metallic substrate exhibit higher corrosion protection ($E_{corr}$) than the pure PEDOT coated metallic substrate. The PEDOT/GE/CF coated metallic substrate has an $E_{corr}$ value is in a range of 0.04 to 0.08 V, an $I_{corr}$ value is in a range of 0.02 to 0.10 μA/cm², an antibacterial rate of about 80 to 90% against *E. coli*, and an antibacterial rate of about 80 to 90% against *Staphylococcus aureus*. In a preferred embodiment, the PEDOT/GE/CF coated metallic substrate has an $E_{corr}$ value of 0.0584 V, an $I_{corr}$ value of 0.0643 μA/cm², an antibacterial rate of 85.25% against *E. coli*, and an antibacterial rate of 83.55% against *Staphylococcus aureus*.

According to a third aspect of the present disclosure, PEDOT/GE/CF coated metallic substrate prepared by the method 100 of the present disclosure may be used in an implantable medical device. Non-limiting examples of implantable medical devices include intravascular catheters (for example, intravenous and intra-arterial), right heart flow-directed catheters, Hickman catheters, arteriovenous fistulae, catheters used in hemodialysis and peritoneal dialysis (for example, Silastic, central venous, Tenckhoff, and Teflon catheters), vascular access ports, indwelling urinary catheters, urinary catheters, silicone catheters, Ventricular catheters, synthetic vascular prostheses (for example, aortofemoral and femoropopliteal), prosthetic heart valves, orthopedic implants, penile implants, neural tissue implants (for example spinal cord meshes, cranioplasty meshes, shunts (for example, Scribner, Torkildsen, central nervous system, portasystemic, ventricular, ventriculoperitoneal), intrauterine devices, dental implants, stents (for example, ureteral stents), artificial voice prostheses, tympanostomy tubes, gastric feeding tubes, endotracheal tubes, pacemakers, implantable defibrillators, bioelectronic devices such as intracochlear or intracranial electronic devices, including neural probes, ossiculoplastic implants; middle ear implants including incus, malleus, stages, incus-stapes, malleus-incus, malleus-incus-stapes; cochlear implants; implants for retention of hearing aids; implants for external fixation;

tubing, cannulas, probes, blood monitoring devices, needles, mouth guards, night guards, dentures, orthodontic retainers, contact lenses, and the like. In some embodiments, the metallic substrate coated with the coating by the method 100 of the present disclosure can be used in an orthopaedic implant.

In some embodiments, the percentage of each component such as GE, or CF in the coating may be modified based on actual biomedical applications.

EXAMPLES

The following examples demonstrate the method 100 of coating the metallic substrate described herein. The examples are provided solely for illustration and are not to be construed as limitations of the present disclosure, as many variations thereof are possible without departing from the spirit and scope of the present disclosure.

Example 1: Material and Fabrication Method

PEDOT-gelatin-ciprofloxacin hybrid composite coating was electrochemically deposited on 316L SS alloy specimens using the cyclic voltammetry method, through the three-electrode cell assembly. The three-electrode cell assembly consists of a 316L SS alloy specimen, saturated calomel electrode (SCE), and graphite rod as working, reference, and counter electrodes, respectively. PEDOT/GE/CF composite coatings were electrochemically deposited on the 316L SS specimens from the 0.3 M $LiClO_4$/ACN solution including 0.1 M EDOT and GE (5-15 wt. %) without and with the antibacterial drug, CF (2.5-10 wt. %). The applied potential was swapped between −0.2 V and +1.2 V vs. SCE at a scan rate of 25 mV/s for ten cycles. Following the completion of the electrochemical deposition, the coated specimen was detached from the cell, rinsed with distilled water, and directly dried in air. Depending on the percentage of GE (5-15 wt. %) and CF (2.5-10 wt. %), the resultant composite coatings were represented as PEDOT/5GE, PEDOT/10GE, PEDOT/15GE, PEDOT/10GE/2.5CF, PEDOT/10GE/5CF and PEDOT/10PGE/15CF, respectively.

Example 2: Surface Characterization Results

Figure 2A:
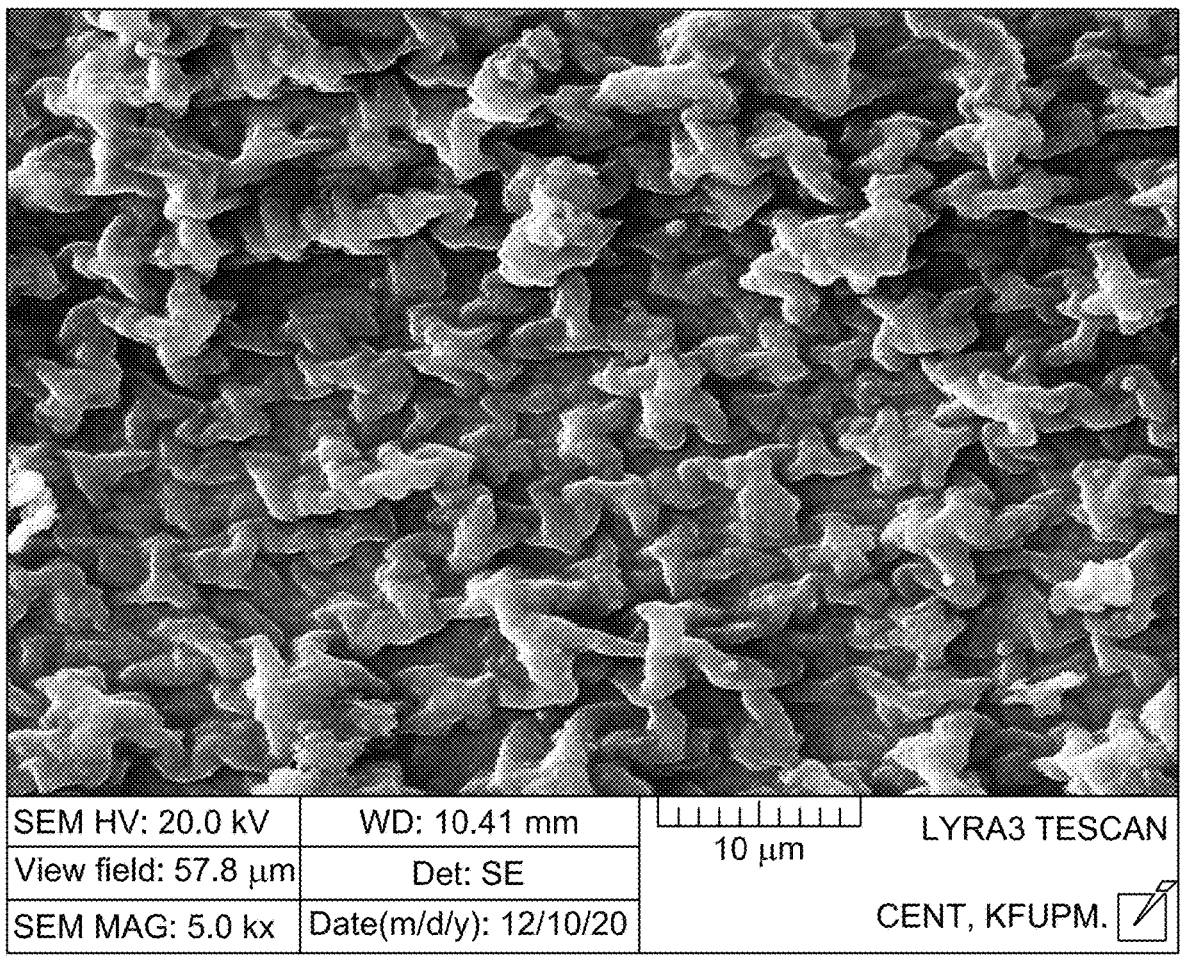
FIG. 2A illustrates a scanning electron microscope (SEM) image of a stainless steel (SS) specimen (316L SS) coated with poly (3,4-ethylene dioxythiophene) (PEDOT), according to certain embodiments.
Figure 2B:
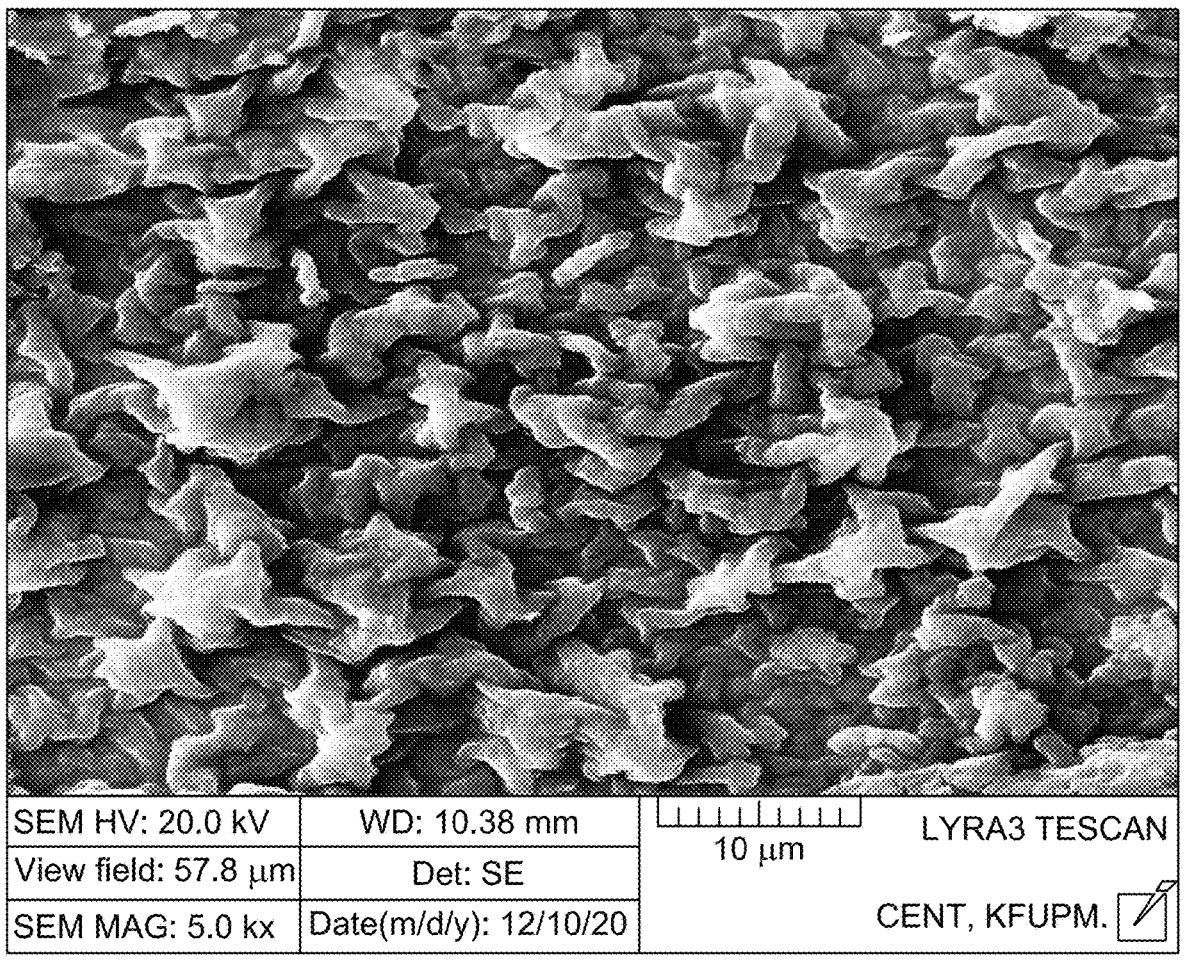
FIG. 2B illustrates a SEM image of the 316L SS specimen coated with PEDOT and 10% gelatin (GE), according to certain embodiments.
Figure 2C:
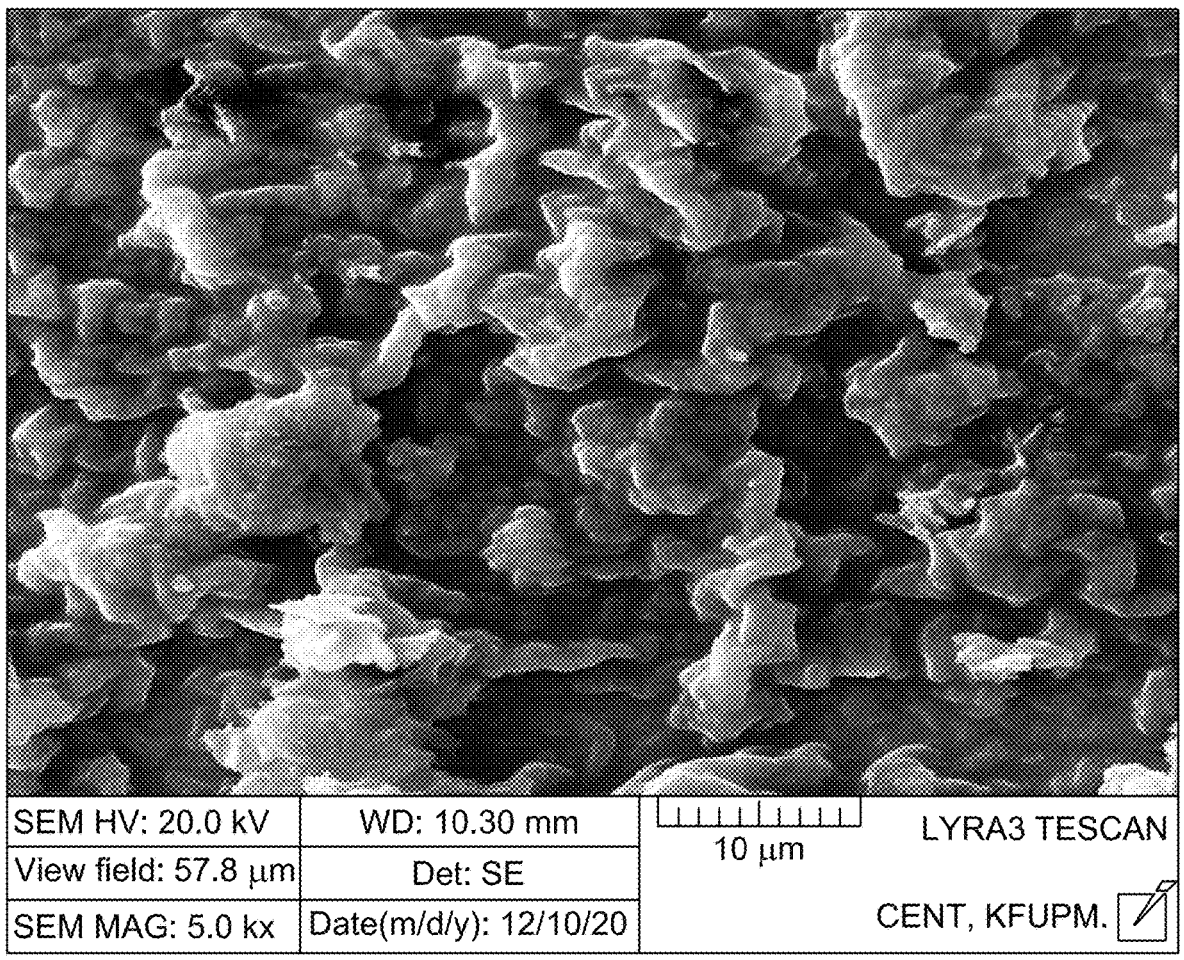
FIG. 2C illustrates a SEM image of the 316L SS specimen coated with PEDOT, 10% GE, and 5% ciprofloxacin (CF), according to certain embodiments.
Figure 2D:
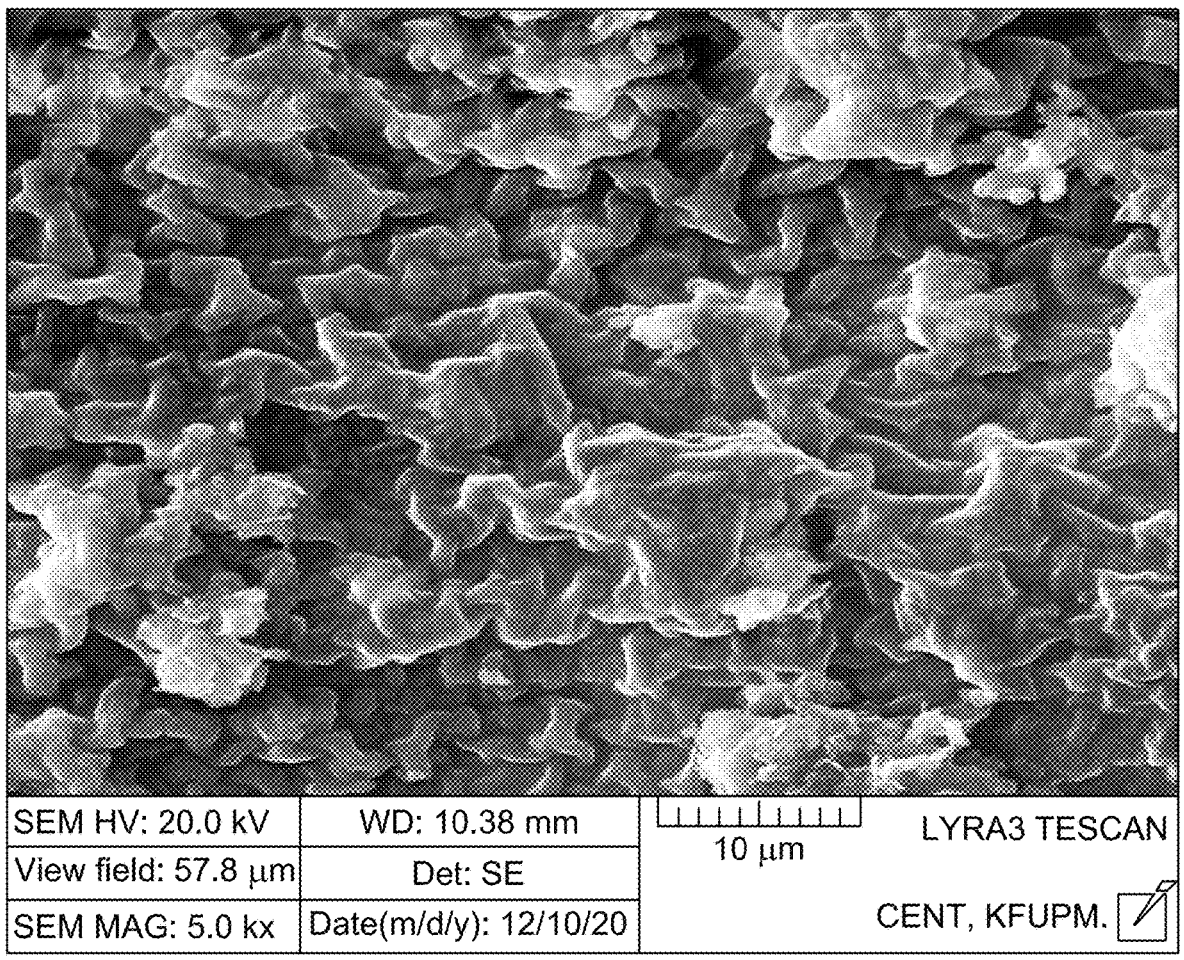
FIG. 2D illustrates a SEM image of the 316L SS specimen coated with PEDOT, 10% GE, and 10% CF, according to certain embodiments.

SEM images of electrodeposited PEDOT and its composite coatings showed the significant difference in their surface morphology based on the constituents including EDOT, gelatin, and loaded drugs. Pure PEDOT coatings displayed homogeneous three-dimensional granular structure construction at the accumulation locations of the film. These accumulated spots were not random, but they are grown as microfibrils in directions parallel to the film's surface (FIG. 2A). It is seen that the microfibrils particles aligned in a uniform manner and size increased with the addition of GE and CF (FIG. 2B-2D).

Example 3: In Vitro Corrosion Study in Simulated Body Fluid (SBF)

Figure 3:
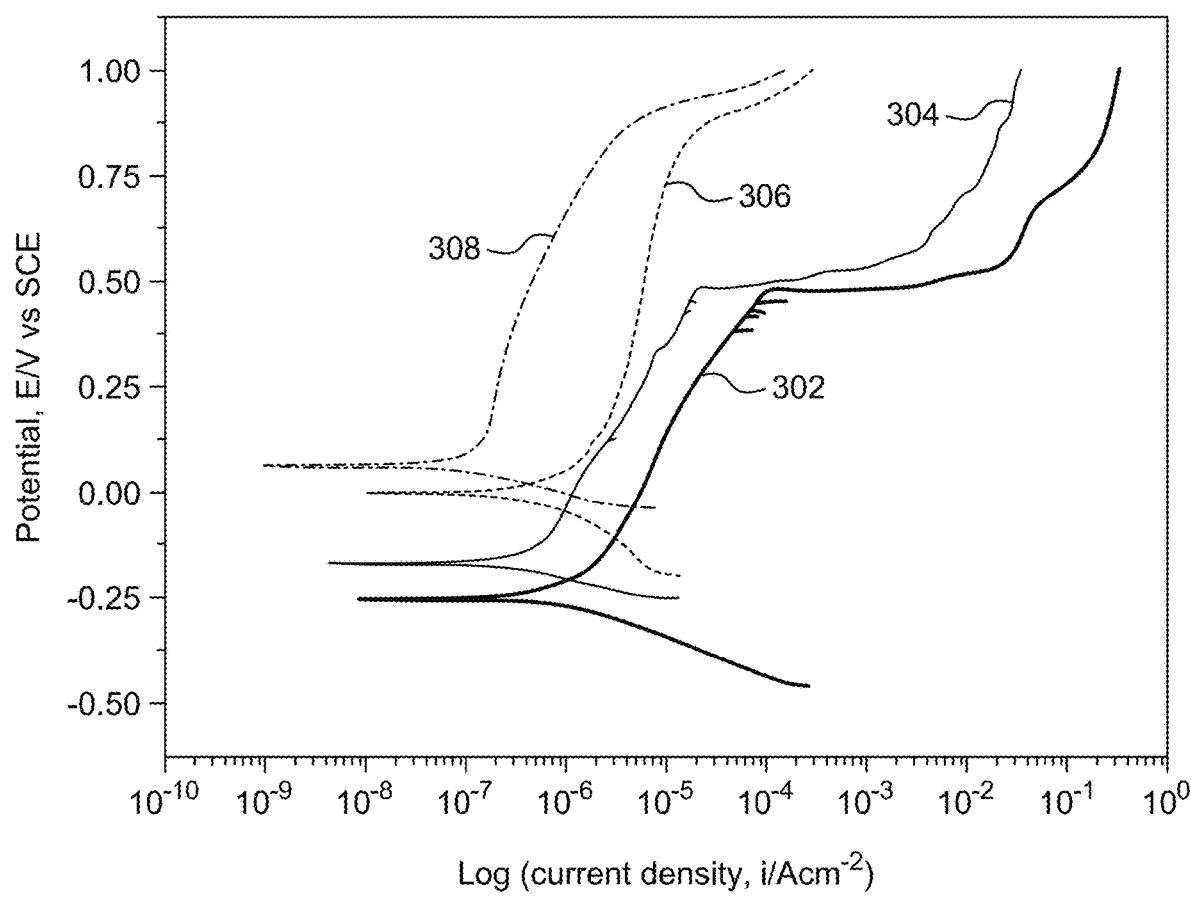
FIG. 3 illustrates a graphical representation showing potentiodynamic polarization (PDP) results of uncoated and coated 316L SS specimens in a simulated body fluid (SBF), according to certain embodiments.

Comprehensive corrosion evaluations of bio-implants are important and mandatory before their utilization in clinical applications. FIG. 3 depicts the typical potentiodynamic polarization plots (PDP) of coated specimens in the SBF. The electrochemical parameters such as $E_{corr}$ and $i_{corr}$, describe the corrosion thermodynamics and kinetics when the investigated materials interact with the tested medium. With all the prepared PEDOT coatings, $E_{corr}$ values of 316L SS (302) specimens shifted towards a more positive direction compared with SS 316L (−0.2396 V), where $E_{corr}$ provided by pure PEDOT (304) was −0.1602V, −0.0981 V for PEODT/10GE (306) and 0.0584 V for PEDOT/10GE/10CF (308). Considering the obtained more positive $E_{corr}$, values, it is validated that 316L SS coated with PEDOT coatings is electrochemically stable in the SBF medium. Pure PEDOT coated specimens displayed the $i_{corr}$ value of 1.6547 $\mu A/cm^2$ that considerably reduced to 0.1287 $\mu A/cm^2$ for PEDOT/10GE and, 0.0643 $\mu A/cm^2$ for PEDOT/10GE/10CF. PEDOT coatings, further confirm the beneficial role of GE and CF in improving the barrier properties of the PEDOT matrix. The presence of GE and CF in the PEDOT matrix provided a compact and dense coating surface, which further improves the barrier features of PEDOT coatings against corrosion in the SBF.

Example 4: Antibacterial Studies

Figure 4A:
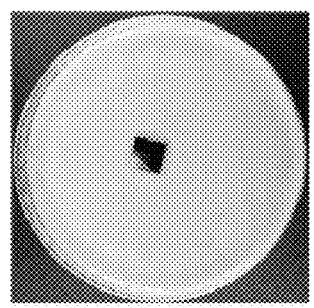
FIG. 4A illustrates antibacterial test results of uncoated (bare) 316L SS substrates against *Staphylococcus aureus*, according to certain embodiments.
Figure 4B:
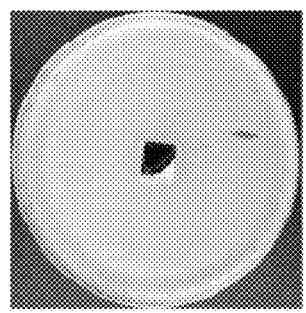
FIG. 4B illustrates antibacterial test results of pure PEDOT coated 316L SS substrates against *Staphylococcus aureus*, according to certain embodiments.
Figure 4C:
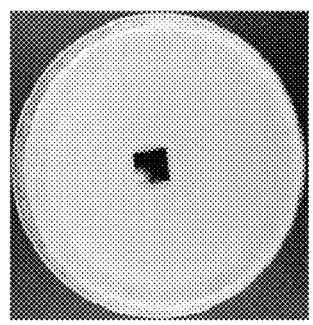
FIG. 4C illustrates antibacterial test results of PEDOT/10GE coated 316L SS substrates against *Staphylococcus aureus*, according to certain embodiments.
Figure 4D:
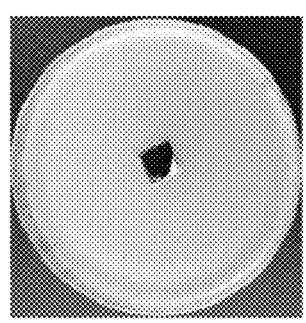
FIG. 4D illustrates antibacterial test results of PEDOT/10GE/10CF coated 316L SS substrates against *Staphylococcus aureus*, according to certain embodiments.
Figure 4E:
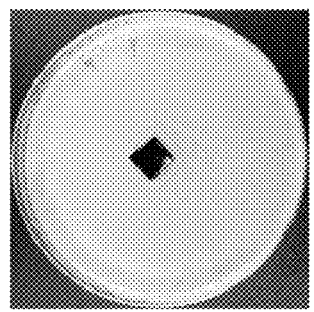
FIG. 4E illustrates antibacterial test results of uncoated (bare) 316L SS substrates against *E. coli*, according to certain embodiments.
Figure 4F:
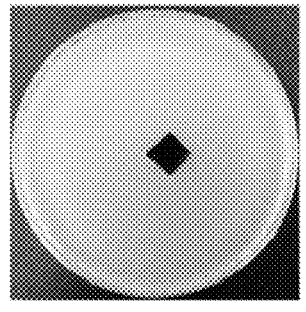
FIG. 4F illustrates antibacterial test results of pure PEDOT coated 316L SS substrates against *E. coli*, according to certain embodiments.
Figure 4G:
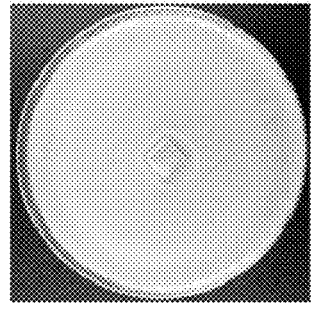
FIG. 4G illustrates antibacterial test results of PEDOT/10GE coated 316L SS substrates against *E. coli*, according to certain embodiments.
Figure 4H:
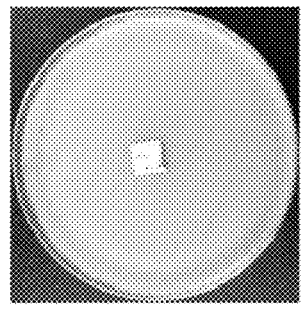
FIG. 4H illustrates antibacterial test results of PEDOT/10GE/10CF coated 316L SS substrates against *E. coli*, according to certain embodiments.

The surface spread plate technique assessed the antibacterial activity of the uncoated and coated 316L SS specimens against gram-positive (*Staphylococcus aureus*) and gram-negative (*Escherichia coli*) bacteria. FIGS. 4A-4H shows the number of bacteriological colonies grown on uncoated and coated 316L SS specimens after 8 h of the incubation period. Among the examined specimens, a higher number of colonies were visibly noticed in the uncoated specimen, signifying the least antibacterial behavior in both inspected bacteria. i.e., *Staphylococcus aureus* ATCC43300 (FIG. 4E), and *Escherichia coli* ATCC8739 (FIG. 4A). PEDOT coated 316L SS substrates showed visible regions of inhibition against both *E. coli* (FIG. 4F) and *Staphylococcus aureus* (FIG. 4B) around the disc representing the bacterial inhibition. Interestingly, the antibacterial rate of PEDOT/10GE/10CF coating was estimated to be about 85.25% against *E. coli* (FIG. 4H) while it was 83.55% against *Staphylococcus aureus* (FIG. 4D) after 8 h incubation time. PEDOT/10GE composite (FIGS. 4C and 4G) with the incorporation of CF addition offered the highest antibacterial performance amongst examined samples, which is accredited to the synergism impact of the PEDOT chain with the release of CF, which is assisted as an antibacterial constituent.

Obviously, numerous modifications and variations of the present disclosure are possible in light of the above teachings. It is therefore to be understood that within the scope of the appended claims, the invention may be practiced otherwise than as specifically described herein.

The invention claimed is:
1. A method of coating a metallic substrate to form a coated metallic substrate, comprising:
    forming a polymer composition comprising:
        a conductive 3,4-ethylene dioxythiophene (EDOT) polymer, a gelatin polyelectrolyte, an antibacterial drug, an organic solvent and an inorganic salt solute;
    immersing a metallic substrate into the polymer composition;
    coating the polymer composition onto a surface of the metallic substrate by cyclic voltammetry to form a coating on the surface of the metallic substrate;
    wherein the metallic substrate is a stainless steel (SS);
    wherein the gelatin and the antibacterial drug are uniformly distributed throughout the coating; and
    wherein the coating has a thickness between 7.0 and 15.0 micrometers (μm).
2. The method of claim 1, wherein the coating has a thickness between 9.50 and 12.55 μm.

3. The method of claim 1, wherein the coating has a rough surface comprising:
a plurality of granular shaped particles in the form of microfibrils in directions parallel to the surface of the metallic substrate; and
a plurality of cauliflower shaped clusters that are uniformly distributed on the surface of the coating.

4. The method of claim 3, wherein the plurality of granular particles is present as microfibrils have an average size in a range of 1 to 15 μm.

5. The method of claim 3, wherein the plurality of cauliflower shaped clusters have an average size in a range of 10 to 25 μm.

6. The method of claim 1, wherein the coating is a single layer coating.

7. The method of claim 1, wherein the coating is a multilayer coating.

8. The method of claim 1, wherein:
the conductive EDOT polymer further comprises at least one selected from the group consisting of polyaniline, polyphenylene, polyacetylene, polypyrrole, poly (N-alkyl pyrrole), polythiophene, poly (alkyl thiophene), polyfuran, polypyridine, polynaphthalene, poly (phenylene vinylene), and copolymers thereof; and
the conductive EDOT polymer is present in the polymer composition in an amount of 70 to 99.9 wt. %.

9. The method of claim 1, wherein the gelatin is present in the polymer composition in an amount of 0.1 to 20 wt. %.

10. The method of claim 1, wherein the organic solvent is at least one selected from the group consisting of acetonitrile (ACN), pyridine, N, N-dimethylformamide (DMF), dimethyl sulfoxide (DMSO), dioxane, formamide, 2-methoxyethanol (MCS), tetrahydrofuran (THF), propylene carbonate, ethanol, and dichloromethane (DCM).

11. The method of claim 1, wherein the inorganic salt solute is at least one selected from the group consisting of quaternary ammonium salts, lithium salts, perchlorate salts, metal phosphates, metal oxides, metal hydroxides, and metal peroxides.

12. The method of claim 1, wherein:
the antibacterial drug is ciprofloxacin (CF); and
the antibacterial drug is present in the polymer composition in an amount of 0.1 to 15 wt. %.

13. The method of claim 12, wherein the coating formed from the polymer composition has an antibacterial rate in a range of 75% to 95% against E. coli, and an antibacterial rate of about 73% to 93% against Staphylococcus aureus, based on a total number of bacteriological colonies produced.

14. The method of claim 1, wherein the coated metallic substrate has a corrosion potential ($E_{corr}$) value measured versus saturated calomel electrode of −0.4 to 0.2 voltage ($V_{SCE}$).

15. The method of claim 13, wherein the coated metallic substrate has a current density ($I_{corr}$) value measured versus saturated calomel electrode of 0.02 to 2.0 microamperes per square centimeter ($\mu A/cm^2$).

16. The method of claim 1,
wherein the inorganic salt solute is lithium perchlorate ($LiClO_4$) and the organic solvent is acetonitrile (ACN), and the method further comprises:
mixing the $LiClO_4$, the ACN, the conductive EDOT polymer, the gelatin and the antibacterial drug to form the polymer composition;
adding the polymer composition to a three-electrode cell assembly containing the metallic substrate, a saturated calomel electrode (SCE), and a graphite rod;
wherein all three electrodes are at least partially immersed in the polymer composition;
applying a potential to the three-electrode cell assembly to form a wet coated substrate; and
removing the wet coated substrate from the polymer composition, washing, and drying to form the coated metallic substrate.

17. The method of claim 16, wherein the coated metallic substrate has a thickness between 9.50 and 12.55 μm, an $E_{corr}$ value measured versus saturated calomel electrode of from 0.04 to 0.08 $V_{SCE}$, an $I_{corr}$ value measured versus saturated calomel electrode of from 0.02 to 0.10 $\mu A/cm^2$, an antibacterial rate of about 80 to 90% against E. coli, and an antibacterial rate of about 80 to 90% against Staphylococcus aureus, based on a total number of bacteriological colonies produced.

18. An implantable medical device, comprising the coated metallic substrate made by the method of claim 1.

* * * * *